United States Patent
Finlayson

(10) Patent No.: US 7,480,419 B2
(45) Date of Patent: Jan. 20, 2009

(54) IMAGE SIGNAL PROCESSING

(75) Inventor: Graham Finlayson, Norwich (GB)

(73) Assignee: UEA Enterprises Limited (GB)

( * ) Notice: Subject to any disclaimer, the term of this patent is extended or adjusted under 35 U.S.C. 154(b) by 575 days.

(21) Appl. No.: 10/536,703

(22) PCT Filed: Dec. 1, 2003

(86) PCT No.: PCT/GB03/05177

§ 371 (c)(1),
(2), (4) Date: May 27, 2005

(87) PCT Pub. No.: WO2004/051569

PCT Pub. Date: Jun. 17, 2004

(65) Prior Publication Data

US 2006/0110052 A1    May 25, 2006

(30) Foreign Application Priority Data

Nov. 29, 2002  (GB) .................................. 0227946.1

(51) Int. Cl.
*G06K 9/40* (2006.01)
(52) U.S. Cl. .................. 382/254; 382/274; 382/275; 358/3.26; 358/3.27
(58) Field of Classification Search .......... 382/260, 382/274, 275; 358/3.26, 3.27, 463
See application file for complete search history.

(56) References Cited

U.S. PATENT DOCUMENTS

| | | | |
|---|---|---|---|
| 5,185,809 A * | 2/1993 | Kennedy et al. | 382/131 |
| 5,294,198 A * | 3/1994 | Schlagheck | 374/4 |
| 5,661,575 A | 8/1997 | Yamashita et al. | |
| 5,771,312 A | 6/1998 | Spitzer | |
| 5,991,456 A | 11/1999 | Rahman et al. | |
| 6,101,271 A | 8/2000 | Yamashita et al. | |
| 6,512,841 B2 * | 1/2003 | Yamada et al. | 382/128 |
| 6,580,825 B2 * | 6/2003 | Bhaskar | 382/169 |
| 6,694,051 B1 * | 2/2004 | Yamazoe et al. | 382/167 |
| 6,730,035 B2 * | 5/2004 | Stein | 600/449 |
| 6,816,193 B1 * | 11/2004 | Kohashi et al. | 348/234 |
| 6,817,982 B2 * | 11/2004 | Fritz et al. | 600/443 |
| 6,826,310 B2 * | 11/2004 | Trifonov et al. | 382/274 |
| 6,919,892 B1 * | 7/2005 | Cheiky et al. | 345/473 |
| 6,990,249 B2 * | 1/2006 | Nomura | 382/254 |

FOREIGN PATENT DOCUMENTS

EP   0 357 842 A1   3/1990
EP   1 209 621 A2   5/2002

OTHER PUBLICATIONS

Chang, Dah-Chung, et al., "Image Contrast Enhancement Based on a Histogram Transformation of Local Standard Deviation," *IEEE Transactions on Medical Imaging*, vol. 17, No. 4, Aug. 1998.

* cited by examiner

*Primary Examiner*—Yosef Kassa
(74) *Attorney, Agent, or Firm*—Craig A. Fieschko, Esq.; DeWitt Ross & Stevens S.C.

(57) ABSTRACT

An image signal is processed by deriving measurements representing the luminance of a signal; calculating values relating to the local mean, the local standard deviation, the local maximum and/or the local minimum; and computing therefrom local standard coordinates such as z-scores which are independent of brightness and contrast.

20 Claims, 6 Drawing Sheets

IMAGE SIGNAL PROCESSING

FIELD OF THE INVENTION

The present invention relates to systems and methods for signal processing, in particular image signal enhancement and/or signal compression.

BACKGROUND OF THE INVENTION

Signal processing systems have the problem that they need to operate in conditions where the signal units are a priori unknown. In terms of images, we might observe a boy sitting under a shaded tree such that the difference in physical units between sunlight and shade is 100000 to 1. Yet, we do not have the capacity to work with such a large signal range.

Embodiments of the present invention are based on the proposal that standard coordinates are particularly useful in imaging. Let $I(x,y)$ denote an image brightness at location x and y. The logarithm of the image response is denoted $i(x,y)$. The brightness and contrast of I can be changed by a linear transform if i: $i(x,y)=mi(x,y)+b$ where m and b are scalings. The brightness term b scales the brightnesses in an image (b is a multiplicand in non-log space) and accounts for changes in the overall brightness of a scene. In terms of a trichromatic camera where the signal is composed of red-, green- and blue-records we have 3 images; $R(x,y)$, $G(x,y)$ and $B(x,y)$ and there might be 3 individual brightness factors. For example the move to a bluish light from a yellowish one might be modelled by large blue- and small red-brightness factors. The contrast term m accounts for the number of log-units available. Consider taking a picture outside where the signal range is 100000 to 1. In contrast a photographic reproduction might have a signal range of 100 to 1, a shift in log-units of 5 to 2. Coding an image in terms of standard coordinates calculated for $i(x,y)$ e.g.

$$\frac{i(x,y) - \mu(i(x,y))}{\sigma(i(x,y))}$$

($\mu$ and $\sigma$ denote mean and standard deviation)

has two main advantages. First, it is invariant to $\mu$ and $\sigma$ (so the z-scores for the photographic image and the outdoor signal are the same). This invariance might be useful for recognising signal content. Second, an image is recast in a way which makes sense in terms of our own visual perception. We as people see scenes with high dynamic ranges (100000 to 1) yet such a high dynamic range is not used in the cortex. Rather, areas in an image with widely different signal ranges are recoded into the same units. For example, the physical units in shadows and highlight regions are small and large respectively. Yet, if the image is coded in (local) standard coordinates the shadow units will become relatively bigger and the highlight coordinates relatively smaller. The import of this is that we can see into shadows and into highlights. This tallies with our experience as human observers. Recoding images in terms of standard coordinates provides an elegant solution to a signal-processing problem with which our own visual system must contend.

SUMMARY OF THE INVENTION

Aspects of the present invention seek to provide improved methods of handling signals. In particular, aspects of the present invention seek to provide a method for signal enhancement by standard coordinates.

According to a first aspect of the present invention there is provided a method of processing an image signal comprising deriving measurements of an input image signal including at least a measurement representing the luminance (1) of the signal, characterised in that the method comprises the further steps of calculating two of the following: the local mean, the local standard deviation, the local maximum and the local minimum of said measurements, computing therefrom local standard coordinates which are independent of brightness and contrast, and forming an output image signal from the standard coordinates.

In a preferred method the standard coordinates are the local z-scores which have been found to give the best results.

Saturation may be preserved or not-preserved.

The output images may be colour or grey-scale.

According to a second aspect of the present invention, there is provided a device for processing an image signal comprising means for deriving measurements of an image signal including at least a measurement representing the luminance of the signal; means for calculating two of the following: the local mean, the local standard deviation, the local maximum and the local minimum; and means for computing therefrom standard coordinates which are independent of brightness and contrast.

BRIEF DESCRIPTION OF THE DRAWINGS

Preferred embodiments of the present invention will now be described, by way of example only, with reference to the accompanying drawings, of which.

DETAILED DESCRIPTION OF PREFERRED VERSIONS OF THE INVENTION

Figure 1:
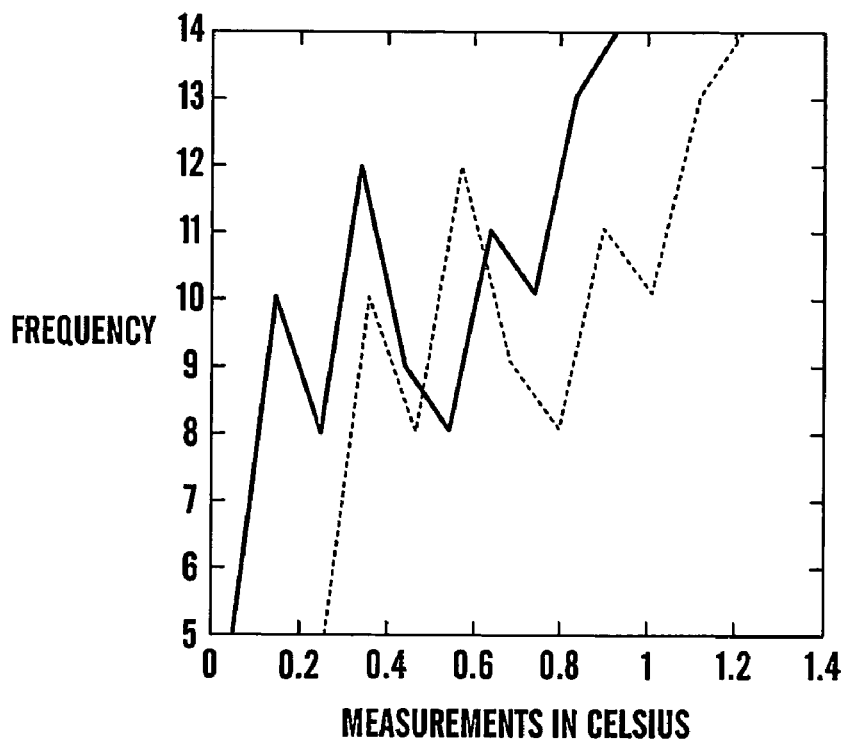
FIG. 1 is a temperature distribution histogram useful in explaining the present invention.

First, let us imagine the following experiment. Three scientists measure the temperature of a substance as various forces and stresses are applied to it. Data is compiled which simplistically measures temperature against amount of stress applied (we might imagine that higher stresses would lead to higher temperature) where the same stress is applied many times. The scientists now wish to compare their results. But, there is a problem: scientist-1 has measurements in Kelvin, Scientist-2 in Celsius and Scientist-3 in Fahrenheit. How can the scientists compare their data? Of course, the answer is simple: we look up a reference book and find the formulae that map temperatures across scales. For example, Fahrenheit is mapped to Celsius according to: $C=0.56F-17.78$ and Kelvin to Celsius: $C=K-273.2$. Note that the correction in each case is linear. Let us now consider linear corrections in terms of images (but the reasoning extends to general digital signals). Let (R,G,B) denote the red, green and blue value recorded in a digital image. These values typically drive a reproduction process such a monitor or a digital printer. It is well known that, to a good approximation, many colours are adequately represented by the amounts of red, green and blue present (see reference [1]). It is important to realise that the RGBs that drive picture creation are often representations of the world (e.g. a digital image). Moreover, in reproduction we often make-adjustments to the image so they 'look' better or have particular signal properties. These two observations (that the signal is a measurement of the world and we might change these measurements) are important considerations. Suppose for example that we take a picture of a white surface under a whitish light. The corresponding RGB=(1,1,1) (white is equal redness, greenness and blueness). Now we alter the illuminant so it is yellower and now record (2,2,1) which is a yellowish colour. Mathematically we might summarise this as:

$$1 \Rightarrow 2*1=2$$

$$1 \Rightarrow 2*1=2$$

$$1 \Rightarrow 1*1=1 \quad (1)$$

Remarkably, the multiplicands 2,2 and 1 in (1) will map all image colours from whitish to yellowish light (see reference [2]). In general RGBs can be mapped across illuminants according to:

$$R \Rightarrow \rho R$$

$$G \Rightarrow \gamma G$$

$$B \Rightarrow \beta B \quad (2)$$

Each scaling factor controls the brightness of image measurements.

Let us now imagine that we take a picture of a scene where there is a pronounced shadow. When we view the picture on a monitor we discover that we cannot see any detail in the shadow: everything is too dark. Assuming that the signal that drives the monitor is between 0 and 1 we can stretch the dark values (at the cost of compressing the bright values) by applying a power function less than 1 (say $\alpha$):

$$R \Rightarrow R^\alpha$$

$$G \Rightarrow G^\alpha$$

$$B \Rightarrow B^\alpha \quad (3)$$

Moreover, each color channel might have a separate power term applied. It useful to think of the power term as changing the contrast in an image (the relative importance of bright and dark values). Combining (2) and (3) we see that:

$$R \Rightarrow \rho R^\alpha$$

$$G \Rightarrow \gamma G^\alpha$$

$$B \Rightarrow \beta B^\alpha \quad (4)$$

To first approximation, two images of the same scene but captured with respect to different viewing conditions and altered to drive different reproduction processes or to account for personal colour preference will be related according to (4). The easiest way to change the look and feel of an image is to change its brightness and contrast. As stated the relations in (4) are non-linear. However, taking logarithms of both sides reveals a natural linear structure:

$$\ln R \Rightarrow \ln \rho + \alpha \ln R$$

$$\ln G \Rightarrow \ln \gamma + \alpha \ln G$$

$$\ln B \Rightarrow \ln \beta + \alpha \ln B \quad (5)$$

In principle, Equation (5) corresponds to the temperature experiment described above The RGBs on the left hand side of are analogous to measurements made by one scientist and those on the right hand side are measurements made by a second scientist. If we know what we are measuring then it is easy to transform coordinates from one side to the other. Indeed, in the colour world it is now possible to calibrate (map coordinates to a reference measurement space) colour devices such as cameras, scanners, printers and monitors (see reference [3]). One implication of this is that if we know how to produce a good looking image for a reference set of viewing conditions, it should be possible, in principle, to produce a good looking image for all conditions. We simply map our image to the reference conditions. Indeed, in a studio environment we can follow this modus operandi and take a picture of a known reference chart, such as a Macbeth Colour Checker (see reference [4]). We then map the colour chart RGBs so that they look 'correct'. Applying the same correction to the rest of the picture should deliver a good-looking image. Of course the process is in fact more complex than that. For example, it would be incorrect to remove the reddish appearance of colours at sunset (in order to remove colour bias due to illumination) because people like to see the sunset colours. Nevertheless, the idea that one can calibrate using reference information is widely used in color imaging and will provide satisfactory results much of the time.

The question arises of how to proceed if calibration is not possible. Returning to the scientists and their temperature measurements, suppose it transpires that not only are the units that were measured different but the equipment that was used was unreliable. Specifically, each of the three scientists used measurement devices that had been lying around the lab for some time and the accuracy of their measurements could not be guaranteed. To a first approximation the measurements (whether in Fahrenheit, Celsius or Kelvin) are a linear combination from where they ought to be, though the linear combinations are not known. For example one might write: TrueCelsius=A*MeasuredCelsius+B where A and B are not known. Of course by measuring the temperature of known physical processes (e.g. the boiling and freezing point of water) we could solve for A and B. If the scientists carried out their experiments some time ago, there is no guarantee, should they calibrate their instruments now, that their calibration would have any bearing on their previous results. Even with such unfavourable, something can be done assuming that the scientists wish to answer particular kinds of questions. Suppose the scientists are interested in determining whether histograms of recorded temperatures (in each of the three experiments) have the same shape. FIG. 1 shows the temperature distribution in Celsius for two of the experiments (suppose one set of measurements were made in Fahrenheit and then converted to Celsius). Clearly the histograms look similar in shape.

Moreover, the main difference between them would appear to be a small shift and a small stretching. To see if this is the case, we can map the temperature measurements to so called z-scores (one example of a standard coordinate). Let us linear transform temperature according to:

$$C=aT+b \quad (6)$$

Let us choose a and b such that the mean of C i.e. ($\mu(C)$) is equal to 0 and the standard deviation of C i.e. ($\sigma(C)$) is equal to 1. The mean and standard deviation of a set of N measurements are equal to:

$$\mu(C) = \frac{\sum_{i=1}^{N} C_i}{N}, \quad \sigma(C) = \sqrt{\frac{\sum_{i=1}^{N} (C_i - \mu(C))^2}{N}} \quad (7)$$

where it is understood that standard deviation measures the spread of a distribution from the mean (a large standard deviation implies a large spread of measurements and a small standard deviation a small spread). It is straightforward to show that $$a = \frac{1}{\sigma(C)} \quad b = \frac{\mu(C)}{\sigma(C)} \quad (8)$$

and so $$C = \frac{(T - \mu(C))}{\sigma(C)} \quad (9)$$

Figure 2:
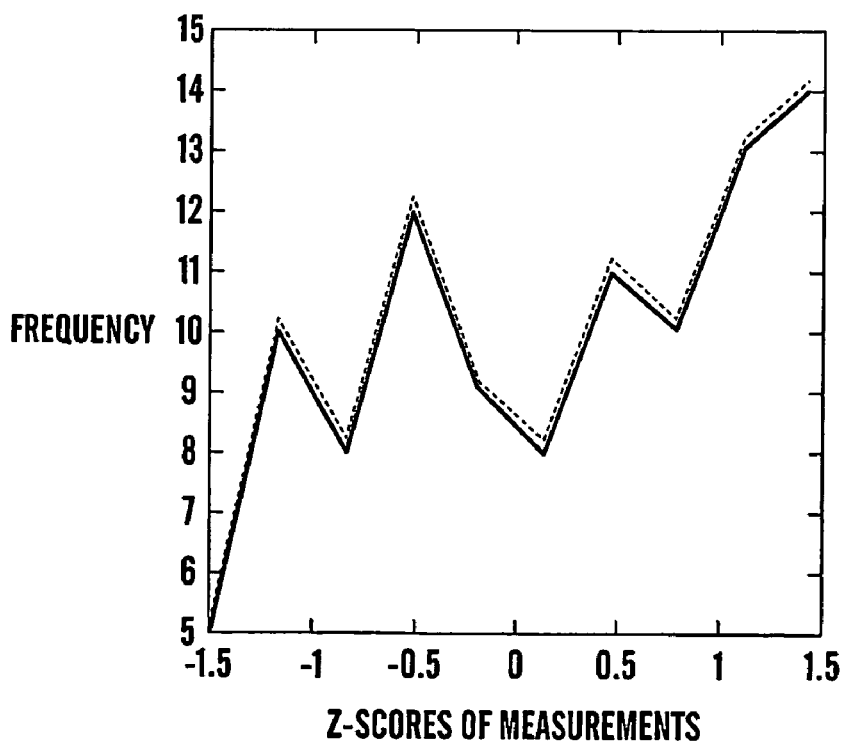
FIG. 2 is a z-score histogram also useful in explaining the present invention.

FIG. 2 shows the two distributions shown in FIG. 1 where the temperatures have been mapped to standard coordinates according to (9) (where each distribution is mapped separately). Thus FIG. 2 indicates that the histograms of Z-scores for the two data sets are the same. (This indicates that the underlying distribution of data differs by a linear transform)

Clearly the distributions are the same and so some inferences can be made e.g. the number of small and large measurements are the same for both experiments. However, it is important to realise that mapping to z-score standard coordinates is not a panacea since it is not and cannot be as powerful as carrying out a full calibration. It is easy to demonstrate this. Simply take 10 numbers and calculate the standard coordinates according to (9). Now add a second 10 numbers to the distribution and recalculate the standard coordinates. Now, because the mean and standard deviation of the data will have changed so too must the standard coordinates for the original 10 numbers in the dataset. Returning to the image example we can see that equation (5) states that the log RGBs in an image shift linearly according to brightness and contrast. From the foregoing discussion it should also be clear that the standard coordinates calculated for image RGBs are independent of brightness and contrast. Denoting ln X as x $$\frac{(r - \mu(r))}{\sigma(r)} = \frac{(\rho + \alpha r - \mu(\rho + \alpha r))}{\sigma(\rho + \alpha r)} \quad (10)$$

The present invention is based on the realisation that (10) is a useful representation for image processing. Not only have we discarded unknowns (brightness and contrast) but we have done so in way which is intuitive. Let us consider the challenges we ourselves face when we look out at the world. When we look at a scene we are confronted by the same image processing challenges that a camera faces. For example, we may see a boy sitting under a shaded tree on a sunny day.

The physical signal reaching our eye is on the order to 100000 to 1 (bright sunlight to shade). Yet, there is no evidence that such a wide dynamic range is encoded in the visual cortex. Rather we need to adopt strategies for encoding images with a smaller dynamic range. One way to do this, in accordance with embodiments of the present invention, is to recode RGBs in terms of standard units. That is we transform image measurements so they are independent of brightness and contrast, i.e. so they are normalised. In general the normalisation will be carried out locally. It can be demonstrated that this makes intuitive sense. A bright pixel seen in the context of other bright pixels may be coded as say 3 standard units above the mean. Similarly, a dim pixel seen in the context of other dim pixels may also be 3 standard units above the mean. That is, two very different physical measurements may, in principle, be coded as the same number and appear equally bright after coding. In practice, standard deviations are calculated across an image with proximate pixels being more important than those far away. So long as the weighting functions are chosen sensibly, bright areas of the image overall appear brighter than darker ones, though detail is drawn out in the shadows and the highlights.

In embodiments of the present invention, the signal is interpreted as composites of measurements made by different devices (though, only one device is actually used). We now consider that the difference between measurements is that the units used are different and unknown. By converting all measurements to standard coordinates we effectively enforce all devices to work in the same units. In terms of images this process enables us to account for changes in image brightness, dynamic range and contrast. The 100000 to 1 signal can be recoded to (say) 100 to 1 such that we can clearly see the detail of the boy in the shade and also objects in direct sunlight. We can do this because locally in the image we are now using the same units.

We interpret a signal as measurements made according to one or more logical measurement devices. If there are many devices it is assumed that each is concerned with a local connected part of the signal. It is assumed that the units each device measures differ across time, and if there is more than one device per signal, across the signal. However, it is assumed that all measurement units are related to one another by linear transforms. For a given set of measurements, standard coordinates are defined by a linear combination of the measurements. For example, Z-scores (one particular standard coordinate) are calculated by subtracting the mean from the measurements and dividing by the measurements' standard deviation. Standard coordinates have the property that they are invariant to linear transforms. By calculating standard coordinates, the signals measured (either across time or location) are transformed to the same units.

Coding images ready for display is a huge research and applied problem (See for example the proceedings of the colour imaging conference for years 1993 through 2002). Finding the ρ, γ and β scalars of Equation (2) is usually called colour constancy and this alone has spawned hundreds of papers; (see references [5,6]) for a review of the major approaches. Determining the contrast is more problematic and their are few papers which explicitly set out to recover the power term α in (5). Recently, the inventor has considered how power term invariance might be achieved, see reference [7].

The questions of contrast and brightness are often implicit in algorithms for image enhancement and dynamic range compression. These algorithms like (5) tend to work in log space but to either consider brightness or contrast but never both. To understand how these algorithms work it is useful to define some notation and two simple image transformations.

First let $r_k(x,y)$ denote the log response at location (x,y) in an image for colour channel k=R,G,B. Second, let us define a coordinate transform from rgb to Luminance l(x,y), Red-Greeness rg(x,y) and Yellow Blueness yb(x,y):

$$l(x,y) = r_R(x,y) + r_G(x,y) + r_B(x,y)$$

$$rg(x,y) = r_l(x,y) - r_G(x,y)$$

$$yb(x,y) = r_R(x,y) + r_G(x,y) - (2 * r_B(x,y)) \quad (11)$$

Equations similar to (11) appear throughout the colour literature (see e.g. references [1,8]). They are the so-called 'opponent' colour channels: l is a measure of white-black (loosely brightness), rg is a measure of red and green (in opposition) and yb is a measure of yellowness blueness (in opposition). Two technical observations are important here. First, in the discussion below the above equations are referred to as opponent channels. Yet there are many ways of calculating opponent channels (the precise equations above may not be used in the methods cited). Second, (11) is a set of linear equations and as such it is possible to compute r, g and b from l, rg and yb (the equations are reversible). Equation (11) is useful because it allows the separation between the achromatic or Luminance (l) and chromatic signal (rg,yb) of a colour (if we multiply an RGB by a scalar x only l will change). Some algorithms for dynamic range compression seek only to change the achromatic aspect (l) keeping the chromatic aspect unchanged.

In accordance with a first prior art method, subtracting the mean cancels brightness. From (5) we see that a change in brightness is modelled by an additive term in log space. Since all pixels have the same additive shift it follows that the mean colour response is also perturbed by this shift. As such, subtracting the mean removes dependence on brightness. Denoting a( ) as a function which calculates the local mean (or average) it follows that $$r_k(x,y)-a(r_k(x,y)) \quad (12)$$

is independent of brightness.

In accordance with a second prior art method, subtracting the maximum cancels brightness. From (5) we see that a change in brightness is modelled by an additive term in log space. Since all pixels have the same additive shift it follows that the maximum colour response is also perturbed by this shift. As such subtracting the maximum removes dependence on brightness. Denoting M( ) as a function which calculates the local maxima it follows that the expression $$r_k(x,y)-M(r_k(x,y)) \quad (13)$$

is independent of brightness.

Some previous algorithms for dynamic range compression/image enhancement will now be discussed.

1) NASAs Multiscale Retinex (MSR)

This algorithm (see reference [9]) discounts local brightness in the R, G and B colour channels. Expression (12) above is used with the local averaging operator a( ) defined as the sum of three Gaussians (giving quite a smooth averaging operator). Contrast is not explicitly considered, though certain global adjustments are made.

It may be noted that, because the local average is subtracted it is common for images to look desaturated (or greyish). This problem resulted in an ad hoc (and unsatisfactory) resaturation phase. Examples of MSR performance can be seen at www.truview.com.

2) Luminance Modified MSR

This algorithm discounts local brightness in the l achromatic channel with the chromatic channels rg and yb undergoing a global adjustment (see reference [10]). Expression (12) above is used with the local averaging operator a( ) defined as the sum of three Gaussians (giving quite a smooth averaging operator). The same filtering was used as for the MSR case.

It may be noted that there was no real improvement observed over the original MSR method. Indeed, the authors of this algorithm suggested that a global adjustment might work equally well.

3) Retinex

Edwin Land and John McCann have developed many variants (e.g see references [11,12,13]) of this algorithm over many years. In principle, expression (13) describes their approach. However, their definition of local maximum is highly complex (being non-linear and iterative). When Retinex works well it can generate pleasing images. Compared to MSR, Retinex works better as subtracting the local maxima tends to keep colours looking as they should look (there is no desaturation problem as with MSR). Unfortunately, when Retinex fails it tends to do so quite badly.

It may be noted that no real mention of the power function is made, although, there is the need to render the output values by an appropriate look up table.

4) Modified Retinex

Because the local maximum function is complex there are many variants which provide variants. Worth mentioning are the works of Brainard and Wandell (see reference [14] which presents a framework where expressions (12) and (13) might be used), the algorithmic work of Funt et al (see reference [15] which provided the first 'accredited' algorithm) and recent work by Sobel and McCann (see reference [16] which modifies the definition of local maxima to take account of overly large local changes in an image). One of the advantages of Retinex is that it is based on psychophysical observations made with human observers. More recent work by Spitzer (see reference [17]) has carried on this approach and has presented an operational model of visual processing that appears to solve some brightness and contrast problems. However, that approach is based on what is known about visual processing and not on what the problem is that needs to be solved. Indeed, that is not discussed at all. Spitzer's discloses a method in which computation is carried out on all three opponent channels. Rather speculatively, Land also suggested a Retinex type computation might be carried out in opponent channels (see reference [18]).

It may be noted that Retinex still has problems. The problem it is trying to solve has never been clearly articulated. Good results are only possible with user intervention. All retinex algorithm have free parameters which must be 'tweaked' on a per image basis.

5) Non-linear Masking:

In departure from previous methods Moroney (see reference [19]) focuses on contrast and not brightness. In principle, if one divides a log response by its local average $$l(x,y)/a(l(x,y)) \quad (14)$$

then contrast must cancel (if we change the contrast in an image the denominator and numerator are scaled by the same factor which cancels). The definition of a here is a Gaussian but with a very large standard deviation (so that local values are only given slightly more weight than far away values). It may be noted that calculation is carried out in a Luminance channel with the chromatic signal left unchanged. Moreover, as a technical note the Local average is calculated in a slightly different way than presented above (though for our purposes the detail is not important)

It may also be noted that non-linear masking works surprisingly well. In part it does so because it is the least aggressive (choosing a Gaussian with a large standard deviation as an averaging filter means the definition of contrast is more global than local). However, it says nothing about brightness and so cannot account for simple artifacts such as colour.

In systems and methods according to embodiments of the present invention, an image is interpreted as measurements made by different but unknown measurement devices (different coherent parts of the image are measured by different devices). This is a logical assumption only. An image is frequently captured by a single device. But, because we may wish to change the image units in different parts of the image (for example to alter the dynamic range) it is useful to think of the image as being a composite of measurements from a set of devices. It is assumed that the units each device measures differ from one another by a linear transform. Local linear corrections are made to the image effectively calculating standard coordinates across the image. Local standard coordinates are independent of brightness and contrast and so are resilient to these changes in an image. Brightness and contrast changes effectively account for most of the differences between images of the same scene. Further, coding images in standard coordinates presents a plausible solution to an imaging problem that our own visual system must face.

Standard Coordinates

Let measurements be denoted $x_i(i=1,2,\ldots,n)$ $X=\{x_1, x_2, \ldots, x_n\}$. These coordinates are transformed linearly: $y_i = ax_i + b$, $y = \{y_1, y_2, \ldots y_n\}$. Standard coordinates defined on X and Y are the same. Numerous standard coordinates (a standard coordinate is a linear transform which renders the data independent of brightness and contrast) might be calculated:

Z-Scores:

$$S_i = \frac{x_i - \mu(X)}{\sigma(X)} \quad (15)$$

Max-min Score:

$$S_i = \frac{x_i - \min(X)}{\max(X) - \min(X)} \quad (16)$$

Min-mean Score:

$$S_i = \frac{x_i - \min(X)}{\mu(X)} \quad (17)$$

To see that (15) works, let $X=10,20,30,40$ and $Y=10,30,50,30$ ($y_i=2x_i-10$). Calculating (15) for X or Y leads to the set: $-1.162, -0.3873, 0.3873, 1.16$. Calculating (16) for X or Y leads to the set: $0,0.333,0.667,1$. Calculating (17) for X or Y leads to the set: $0,0.5,1,1.5$. Of course there are many other standard coordinate systems. The advantage of scores (15) to (17) is that they are based on simple well understood statistical operators: mean, max and min. However, there are many equations of the form 15 to 17 which will remove brightness and contrast; these are just meant to be examples of "standard co-ordinates" not an exhaustive list.

Calculating Local Standard Coordinates

We are assuming that an image can be thought of composed of a set of different regions and that each region has measurements in different units. It follows if we can standardise coordinates locally.

Calculating the Local Mean

This is easy to do and the literature is replete with possible algorithms. The most common method is to convolve an image with an averaging filter such as a Gaussian. A Gaussian has large values near the origin and these decrease monotonically as a function of distance from the mean. To illustrate how the convolution works let $[1,2,2,2,5,5,5]$ be a 1-d signal and $[0.5, 0.5]$ an averaging filter. We simply place the averaging filter on top of the signal (at a given location), multiply the filter and the signal and sum up. This is repeated for each position along the signal. Operating in this way we see that the output of the convolution is $[1.5, 2, 2, 3.5, 5, 5]$. We need to make a couple of comments. First, notice that the edges (1 to 2 and 2 to 5) have been diminished in scale. This is as we would expect if we locally average the image. Second, we began with 7 inputs but have only 6 outputs. The reason for this is that we have not defined what we do at the boundary of the signal. In terms of 2-dimensional signals, we might assume that outside of the image everything is zero (these are called Dirichlet boundary conditions (see reference [20]). Or that the signal is not is constant at the boundary (Neumann conditions (see reference [20]). What needs to be done relative to each assumption is well understood (and is a detail). We implicitly assume this issue has been dealt with in the discussion below. If $s(x,y)$ is a 2-dimensional signal (such as an image) and $a(x,y)$ an averaging filter, then convolution is defined mathematically as:

$$\mu(x, y) = \int_u \int_v a(u, v) s(x-u, y-v) dv du \quad (18)$$

where it is assumed $\int_u \int_v a(u,v) dv du = 1$

If $s(x,y)=k$ (the same value at all locations) then the average of this signal should be 1.

Calculating the Local Max

A possible way of determining a local maximum is that we could compute a local maximum say amongst all pixels within 5 pixels from location (x,y). We could denote this $M_5(x,y)$. A maximum within a distance 10 could also be calculated: $M_{10}(x,y)$. In general we might define a local maximum as:

$$M(x, y) = \frac{\sum_{i=1}^{N} w_i M_i(x, y)}{N} \quad (19)$$

where $w_i$ are weights that decrease as i increases and the sum of the weights is 1.

Note, it is important to realise that (19) is just one of many ways in which a local maximum might be defined.

Calculating the Local Min

As for the maximum case, we could define a local minima function $m_d(x,y)$ which returns at (x,y) the minima of all pixels within d pixels from (x,y). The local minima for an image would be defined as:

$$m(x, y) = \frac{\sum_{i=1}^{N} w_i m_i(x, y)}{N} \quad (20)$$

where again the sum of the weights is 1.

Calculating Local Standard Deviation

Standard deviation is described in Equation (7). This is the square root of the average of the squared deviation of the mean. Clearly, we might calculate this locally according to:

$$\sigma(x,y) = \sqrt{\int_u \int_v a(u,v)(s(x-u,y-v) - \mu(x-u,y-v))^2 \, dv \, du} \quad (21)$$

where the averaging filter a( ) may be the same or different than that used for computing the mean.

Calculating Local Standard Coordinates

In general we just substitute (18) to (21) in scores (15) to (17). For example the local definition of z-score is given below:

$$z(x,y) = \frac{i(x,y) - \mu(x,y)}{\sigma(x,y)} \quad (22)$$

Local min-max scores or min-mean scores are similarly simply defined.

EXAMPLES

Figure 3:
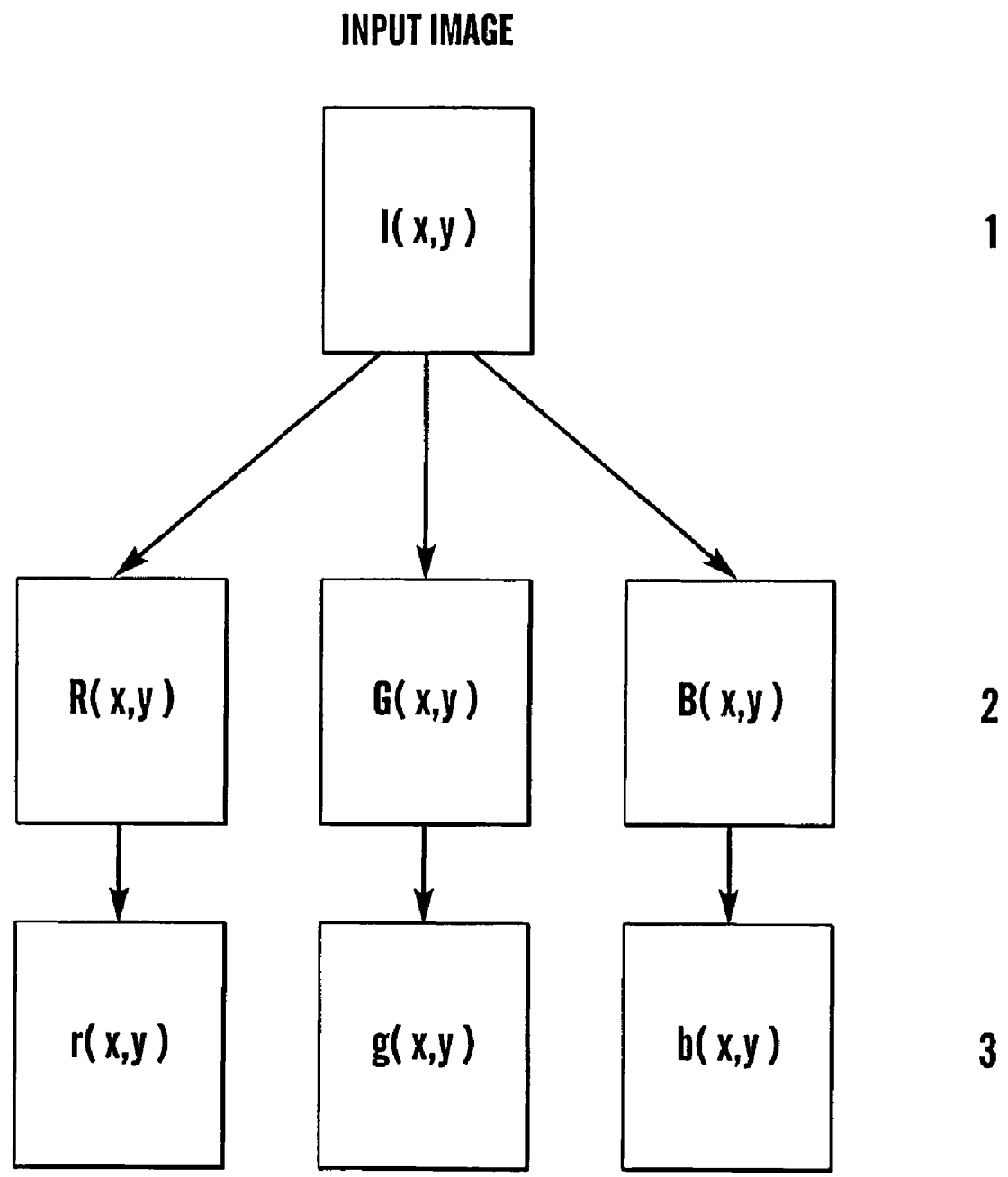
FIGS. 3 to 5 show the steps of a method in accordance with a first preferred embodiment of the present invention.
Figure 4:
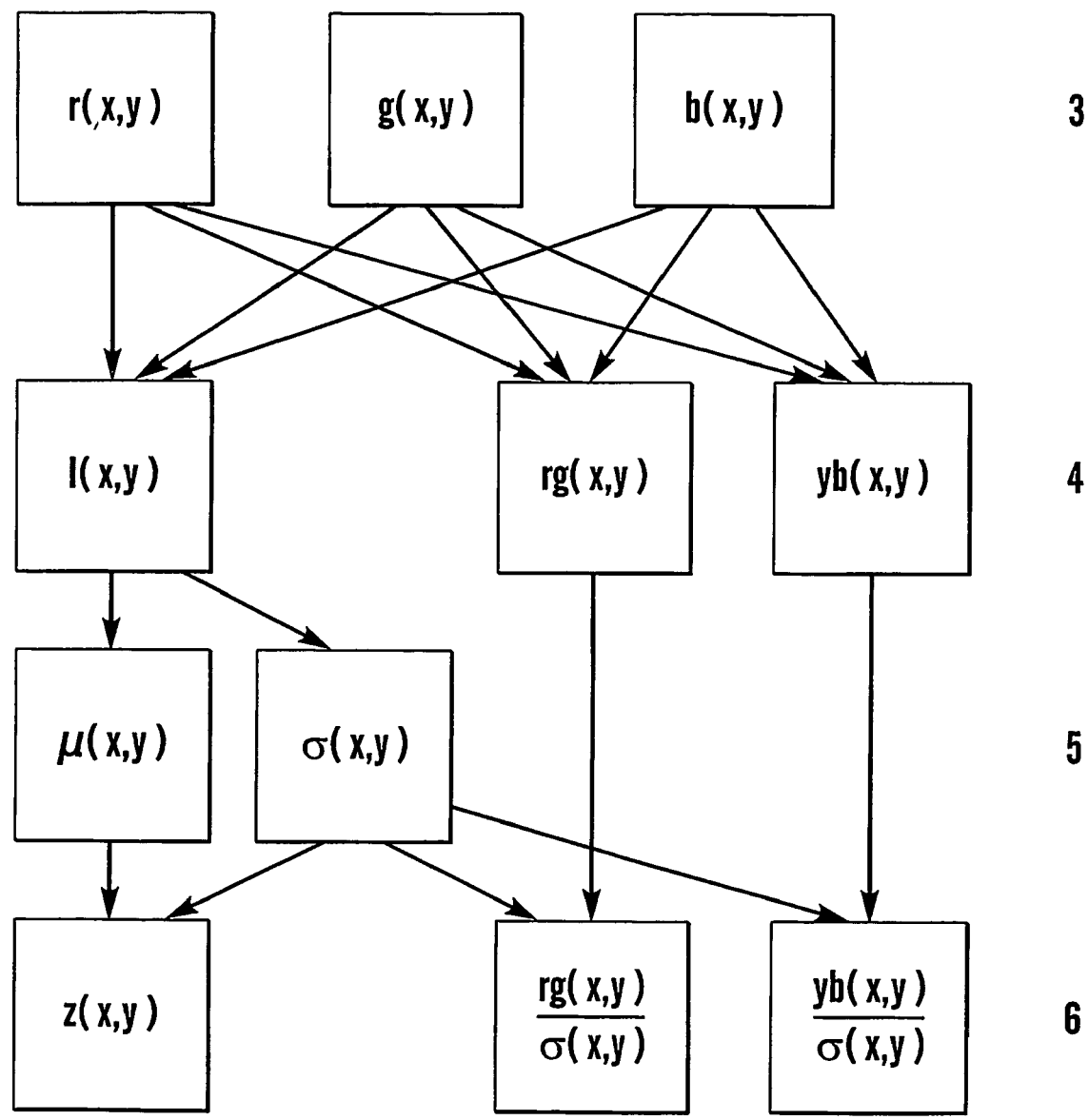
Figure 5:
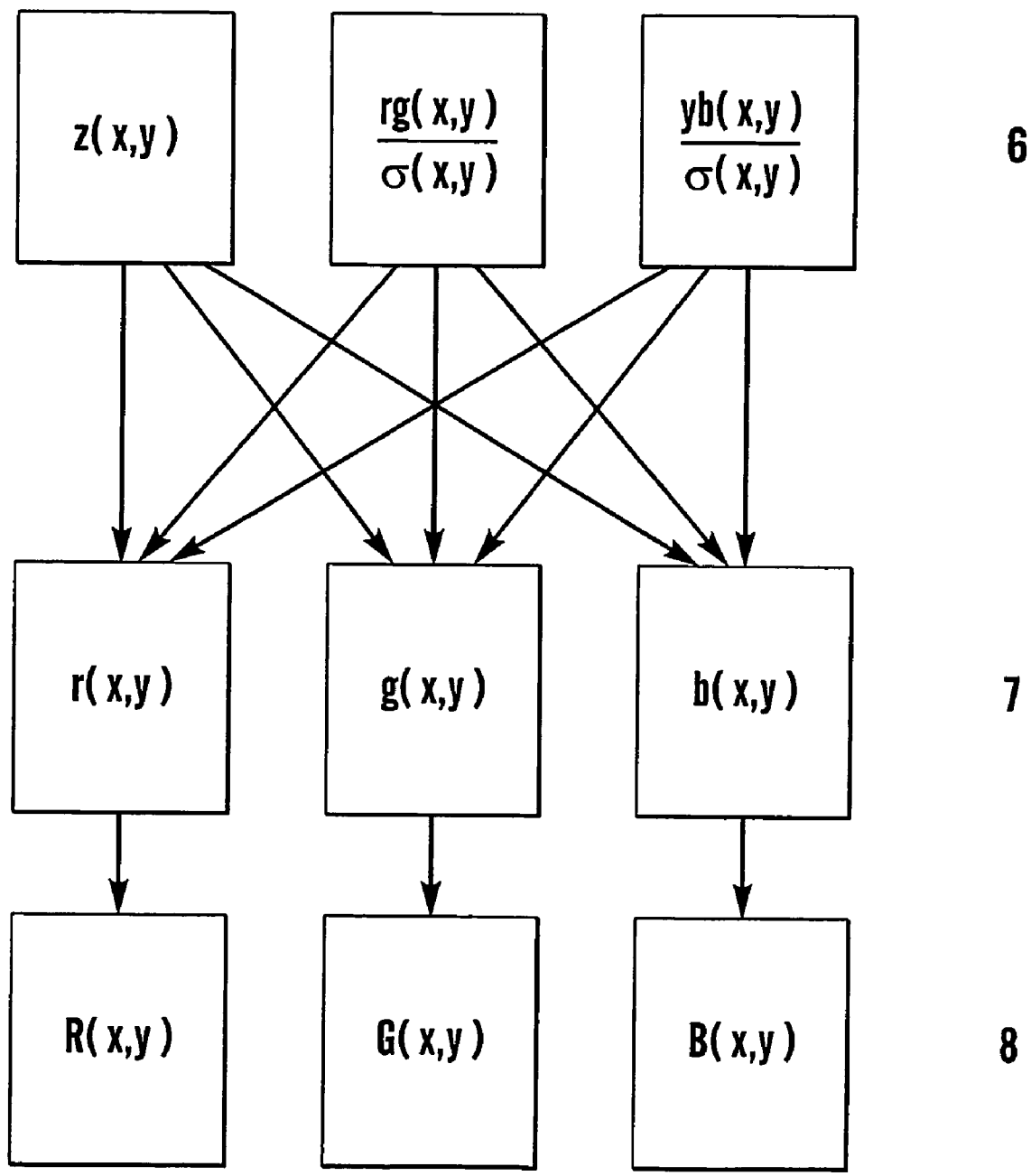

FIGS. 3, 4 and 5 outline a schema for processing an image. In summary we take an image, convert to log-opponent coordinates then replace the Luminance signal by z-scores and then form an output image. The results are images where the details in bright and dark regions are better balanced. Moreover, the images generally look more pleasing. In detail the steps of this particular embodiment are:

1) I(x,y) is an input image item
2) composed of R(x,y), G(x,y) and B(x,y) (RGB color channels)
3) taking logarithms gives: r(x,y), g(x,y) and b(x,y)
4) we compute opponent responses according to Equation (11)
5) we compute local estimates of the mean and standard deviation of the Luminance channel, (18) and (21); these steps relate to the weighting functions mentioned previously.
6) this is used to compute a z-score (22). Of course z-scores will have some negative and some positive values. To regard z-scores as luminance signals in the log domain we have to make z-scores all negative. This is easily achieved in that we simply calculate the largest z-scores over the whole image and then subtract this from each individual z-score (at each pixel). After this operation the z-scores will all be negative with a maximum of 0. If standard co-ordinates are calculated according to ~(16) or ~(17) then they will be all positive. Again subtracting by the global maxima will result in all negative values that can be regarded as log brightness values. Notice the red-green and blue-yellow channels have their contrast but not brightness adjusted (by the sigma for the luminance channel). Empirically it is found that to get good looking images requires similar contrast in each of the three channels.
7) We invert (11) and solve for log R, G and B
8) We invert the logarithm and the images are ready for display.

While the other method steps given above will generate images where detail is drawn out in the images, it is the recoding of the data as z-scores in the present example (and standard coordinates in general) in steps 5 and 6 which has significant advantages. The other method steps are however important especially if the aim is to produce pleasing images for display. However, the number of ways we might calculate opponent channels, standard coordinates etc are too many to enumerate. A user will select the other method steps, i.e. 1 to 4, 7 and 8, as appropriate. The common enabling step, however, is the standard coordinate calculation. When processing input images such as still photographs according to the schema described, grey-scale output images are obtained which enable detail to be pulled out (e.g. out of shadow regions). If saturation is defined as the angle between RGB and the vector for white, this angle changes pre and post z score calculation.

Figure 6:
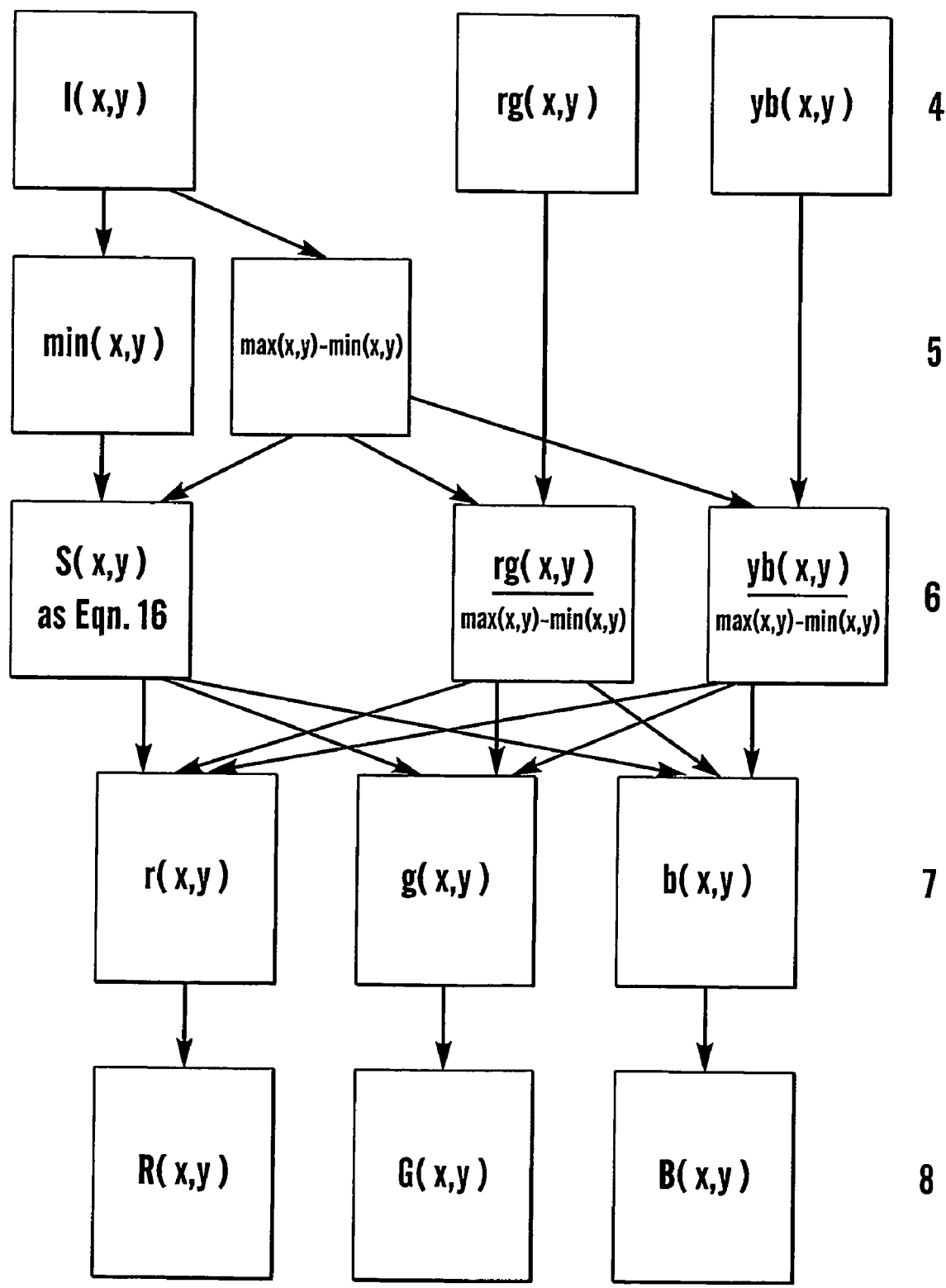
FIG. 6 shows some of the steps of a method in accordance with a second embodiment of the present invention.

FIG. 6 shows the corresponding steps 3 to 8 of a second embodiment which computes the min-max score S as given by equation 16.

Figure 7:
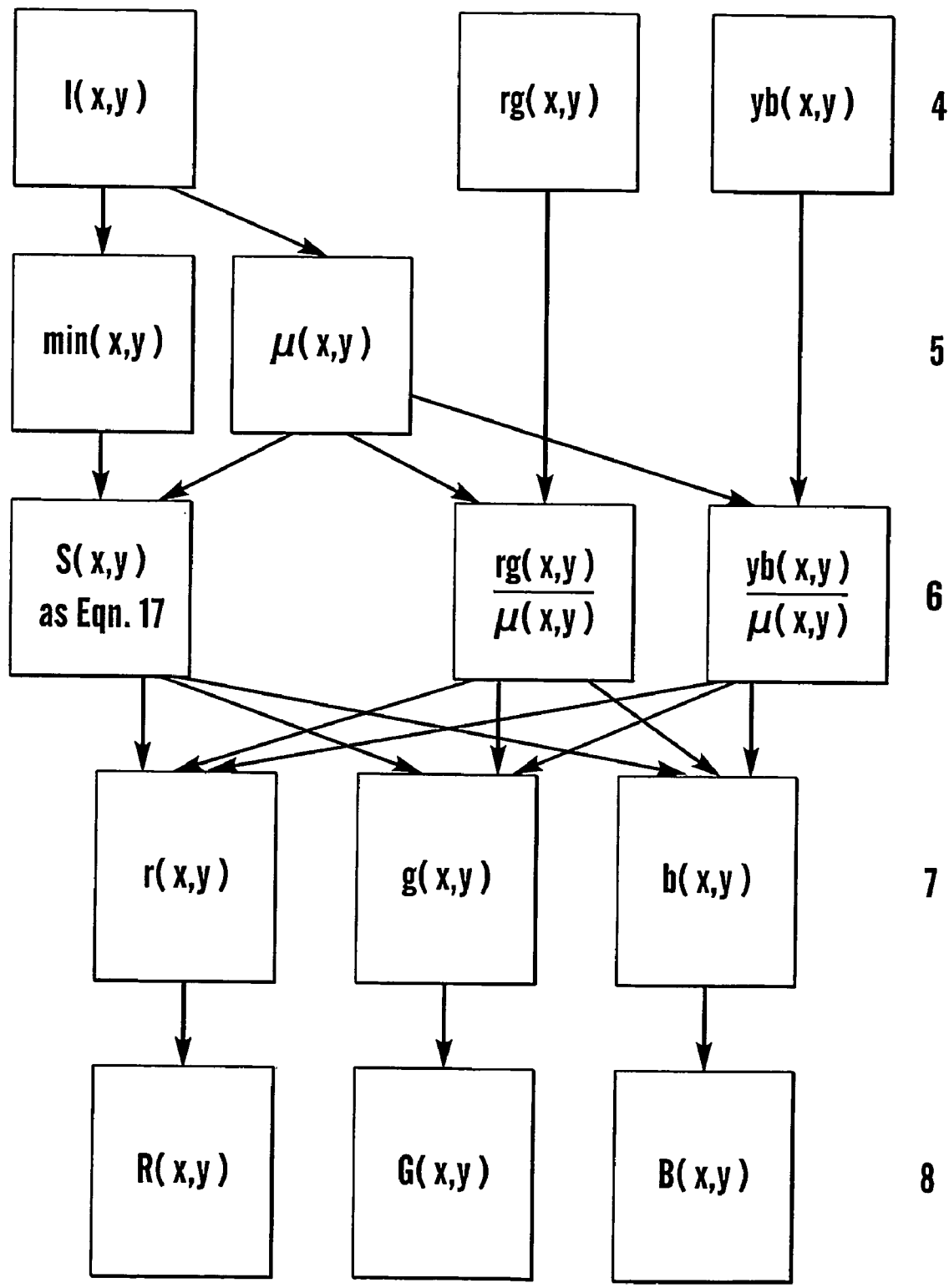
FIG. 7 shows the corresponding steps of a method in accordance with a third embodiment of the present invention.

FIG. 7 shows the corresponding steps of a third embodiment which computes the min-mean score S as given by equation 17.

We emphasise again that the key step is calculating the standard co-ordinates for the luminance image and then reintegrating this luminance information with the original image to get output RGBs. Rather than explicitly calculating the rg and yb opponent channels we might instead proceed as follows:

1. Let us denote log luminance (as before) l(x,y)
2. Let the new log luminance (calculated in step 6 above) be denoted o(x,y)
3. Exponentiating these values gives non-log luminance $L(x,y) = \exp(l(x,y))$ and $O(x,y) = \exp(o(x,y))$
4. We then change the RGB for the original image according to the following 3 equations:

$$R\text{new}(x,y) = R(x,y) * O(x,y)/L(x,y)$$

$$G\text{new}(x,y) = G(x,y) * O(x,y)/L(x,y)$$

$$B\text{new}(x,y) = B(x,y) * O(x,y)/L(x,y)$$

The steps 1 to 4 above are also discussed in reference (10) and result in colour images where the details are better balanced throughout the image.

We also note that while we find pleasing images result in computing luminance standard co-ordinates, it is also possible to calculate standard co-ordinates separately for r(x,y), g(x,y) and b(x,y).

Empirically it is found that the precise definition of Luminance has an impact on the appearance of the image. An alternative inversion (in step 7) where (11) is inverted with the constraint that saturation is preserved (saturation is calculated in RGB and the input saturation equals the output saturation) leads to improved grey-scale images. If the angle defined in the previous paragraph is held fixed, saturation may be preserved. The computation may be carried out in Luminance only, and the new Luminance integrated to form a colour image.

REFERENCES

[1] R. W. G. Hunt. *The Reproduction of Color*. Fountain Press, 5th edition, 1995.
[2] G. D. Finlayson, M. S. Drew, and B. V. Funt. Spectral sharpening: sen~sor transformations for improved color constancy. *J. Opt. Soc. Am. A*, 11(5):1553-1563, May 1994.
[3] H. R. Kang. *Color Technology for* electronic imaging *devices*. SPIE, 1997.
[4] C. S. McCamy, H. Marcus, and J. G. Davidson. A color-rendition chart. J. *App. Photog. Eng.*, pages 95-99, 1976.
[5] G. D. Finlayson. Coefficient color constancy, 1995. MSc thesis, Simon Fraser University, School of Computing Science.

[6] G. D. Finlayson, S. D. Hordley, and P. M. Hubel. Color by correlation: A simple, unifying framework for color constancy. *IEEE Transactions on pattern analysis and machine intelligence*, 23(11):1209-1221, November 2001.

[7] G. D. Finlayson and R. Xu. Log gamma normalization. In *IS&T 10th color imaging conference*. November 2002. to appear.

[8] B. A. Wandell. *Foundations of Vision*. Sinauer Associates, 1st edition, 1995.

[9] Zia ur Rahman, Daniel Jobson, and Glenn Woodell. Method of improving a digital image. U.S. Pat. No. 5,991,456 (23 Nov. 1999), 1999.

[10] K. Barnard and B Funt. Investigations into multi-scale retinex (msr). In *Colour Imaging Vision and Technology*, ed. L. W. MacDonald and M. R. Luo, pages 17-36. 1999.

[11] E. H. Land. The retinex theory of color vision. Scientific American, pages 108-129, 1977.

[12] E. H. Land and J. J. McCann. Lightness and retinex theory. *J. Opt. Soc.* Amer., 61:1-11, 1971.

[13] J. J. McCann. Lessons learned from mondrians applied to real images and color gamuts. In *IS&T and SID's 7th Color Imaging Conference*. 1999.

[14] D. A. Brainard and B. A. Wandell. Analysis of the reinex theory of color vision. *J. Opt. Soc. Am., A,* 36:1651-1661, 1986.

[15] B. V. Funt, F. Cuirea, and J. McCann. Retinex in matlab. In *IS&T and SID's 8th Color Imaging Conference*, pages 112-121. 2000.

[16] R. Sobel. Improving retinex algorithm for rendering wide dynamic range photographs. In *Human Vision and Electronic Imaging VII*, volume 4662, pages 341-348. 2002.

[17] Hedva Spitzer. Method for automatic partial white balance correction U.S. Pat. No. 5,771,312 (23rd Jun. 1998), 1998.

[18] E. H. Land. Recent advances in retinex theory and some implications for cortical computations: Color vision and the natural image. *Proc. Natl. Acad. Sci,* 80:5163-5169, 1983.

[19] N. Moroney. Local color correction using non-linear masking. In *IS&T and SID's 8th Color Imaging Conference*, pages 108-111. 2000.

[20] D. L. Kreider, R. G. Kuller, D. R. Ostberg, and F. W. Perkins. *An introduction to linear analysis*. Addison Wesley, 1966.

The invention claimed is:

1. A method of processing an image signal comprising deriving measurements of an input image signal including at least a measurement representing the luminance (1) of the signal, characterised in that the method comprises the further steps of calculating two of the following: the local mean, the local standard deviation, the local maximum and the local minimum of said measurements, computing therefrom local standard coordinates which are independent of brightness and contrast, and forming an output image signal from the standard coordinates.

2. A method according to claim 1, wherein the local mean and the local standard deviation are calculated and said standard co-ordinates are the local z-scores.

3. A method according to claim 2, wherein, in parallel with the computation of the z-scores, colour channel signals are obtained by dividing by said standard deviation.

4. A method according to claim 1, wherein the local maximum and the local minimum are calculated and said standard co-ordinates are the local max-min scores.

5. A method according to claim 1, wherein the local minimum and the local mean are calculated and said standard co-ordinates are the local min-mean scores.

6. A method according to claim 1 wherein, before the calculating step, logarithms are taken of the R, G and B colour channel values and opponent responses are computed.

7. A method according to claim 6 wherein, besides luminance, said opponent responses include red-greenness and yellow-blueness.

8. A method according to claim 1 wherein, after computing the local standard coordinates, the logarithms of the R, G and B values are determined and the determined logarithms are inverted.

9. A method according to claim 1 wherein a grey scale output image is obtained and saturation is not preserved.

10. A method according to claim 1 wherein a colour output image is obtained and saturation is preserved.

11. A device for processing an image signal comprising means for deriving measurements of an image signal including at least a measurement representing the luminance of the signal; means for calculating two of the following: the local mean, the local standard deviation, the local maximum and the local minimum; and means for computing therefrom standard coordinates which are independent of brightness and contrast.

12. A device according to claim 11 wherein the measurement deriving means further derives measurements representing red-greenness and yellow-blueness.

13. A method of electronically processing an input image signal, the method including the steps of:
   a. obtaining measurements of an input image signal, the measurements including at least a luminance measurement of the input image signal;
   b. calculating at least two of:
      (1) the local mean,
      (2) the local standard deviation,
      (3) the local maximum, and
      (4) the local minimum,
      of the measurements;
   c. determining from the calculations local standard coordinates which are independent of brightness and contrast; and
   d. displaying an output image signal obtained from the local standard coordinates.

14. The method of claim 13 wherein:
   a. the local mean and the local standard deviation are calculated, and
   b. the local standard coordinates are local z-scores.

15. The method of claim 13 wherein:
   a. the local maximum and the local minimum are calculated, and
   b. the local standard coordinates are local max-min scores.

16. The method of claim 13 wherein:
   a. the local minimum and the local mean are calculated, and
   b. the local standard coordinates are local min-mean scores.

17. The method of claim 13 further including the step of computing opponent color channels for the input image signal.

18. The method of claim 17 wherein the opponent color channels include luminance, red-greenness and yellow-blueness.

19. The method of claim 13 wherein the output image signal is in grey scale.

20. The method of claim 13 wherein the output image signal is in color.

* * * * *

UNITED STATES PATENT AND TRADEMARK OFFICE
CERTIFICATE OF CORRECTION

| | | |
|---|---|---|
| PATENT NO. | : 7,480,419 B2 | Page 1 of 1 |
| APPLICATION NO. | : 10/536703 | |
| DATED | : January 20, 2009 | |
| INVENTOR(S) | : Graham Finlayson | |

It is certified that error appears in the above-identified patent and that said Letters Patent is hereby corrected as shown below:

In column 3, line 67, after "above" insert -- . --.

In column 6, line 47, delete "their" and insert -- there --, therefor.

In column 8, line 59, after "important)" insert -- . --.

In column 12, line 27, delete "Exponentatiating" and insert -- Exponentiating --, therefor.

Signed and Sealed this
Twenty-ninth Day of November, 2011

David J. Kappos
*Director of the United States Patent and Trademark Office*